(12) United States Patent
Tsai et al.

(10) Patent No.: US 6,901,416 B2
(45) Date of Patent: May 31, 2005

(54) METHOD AND SYSTEM FOR ESTIMATING EXPORTATION TIME

(75) Inventors: Shi-Hui Tsai, Taipei (TW); Chih-Hung Huang, Taipei (TW); Hung-Liang Chiu, Taipei (TW); Hua-Shan Hsu, Taipei (TW)

(73) Assignee: Inventec Corporation, Taipei (TW)

( * ) Notice: Subject to any disclaimer, the term of this patent is extended or adjusted under 35 U.S.C. 154(b) by 470 days.

(21) Appl. No.: 10/003,581

(22) Filed: Nov. 14, 2001

(65) Prior Publication Data

US 2004/0249868 A1 Dec. 9, 2004

(51) Int. Cl.[7] .............................................. G06F 17/30
(52) U.S. Cl. ........................... 707/203; 707/10; 705/23
(58) Field of Search .................... 707/1–10, 100–104.1, 707/200–205; 705/22, 23, 36, 26

(56) References Cited

U.S. PATENT DOCUMENTS 6,681,211 B1 * 1/2004 Gatto ........................... 705/36

2002/0055886 A1 * 5/2002 Hinckley ...................... 705/26

* cited by examiner

Primary Examiner—Mohammad Ali
(74) Attorney, Agent, or Firm—Mikio Ishimaru (57) ABSTRACT

A method and system for estimating exportation time are proposed, for connecting a manufacturer through a network to a system for estimating exportation time, wherein the system estimates product exportation time for client orders received by the manufacturer according to practical operating conditions in product manufacture. In the use of the foregoing method and system, a first database stores uploaded and manufacture operating data from the manufacturer, so as to prompt the system to perform data operation and processing according to the stored data. Operation data results are stored in a second database, and used as reference to provide manufacture schedule data, order reply data, abnormal condition data and material insufficiency data to be downloaded by the manufacturer, so as to allow the manufacturer to execute product manufacture according to the downloaded data, and immediately realize problems in product manufacture to solve.

17 Claims, 4 Drawing Sheets

Exportation Notice

[Inquire] [Execute]

| Order number | Category number | Quantity | Manufacture date | Exportation date |
|---|---|---|---|---|
| 1100127394 | PC6847HAAAC2 | 11 | 2000/09/29 | 2000/09/29 |
| 1100127397 | PC7232IAA008 | 19 | 2000/09/29 | 2000/09/29 |
| 1100127531 | PC6861EAA002 | 9 | 2000/09/29 | 2000/09/30 |
| 1100127547 | PC6861IAA168 | 10 | 2000/09/29 | 2000/09/30 |
| 1100127547 | PC7216HAA168 | 10 | 2000/09/29 | 2000/09/30 |
| 1100127547 | PC7216HAA161 | 20 | 2000/09/29 | 2000/09/30 |

METHOD AND SYSTEM FOR ESTIMATING EXPORTATION TIME

FIELD OF THE INVENTION

The present invention relates to methods and systems for estimating exportation time, and more particularly, to a method and system for estimating exportation time, allowing manufacturer to be connected through a network to the system, which estimates exportation time for replying a client according to practical conditions for operating client orders received by the manufacturer, and simultaneously makes a schedule of product manufacture.

BACKGROUND OF INVENTION

In general, a manufacturer exports products to a client on the next day after receiving an order from the client. However, due to lack of a system for integrating data relating to client orders, material requirements and stock records, a marketing department of the manufacturer cannot obtain practical operating conditions for precisely estimating product exportation time for replying the client. In addition, since the manufacturer is not capable of definitely realizing the practical operating conditions of materials and stocks, short of materials may possibly occur, thereby resulting in delay in product manufacture and exportation.

Moreover, a schedule of product manufacture is manually planned; this is labor-consuming and ineffectively responsive to possibly occurred problems in real time during product manufacture. For example, if a client cancels an order, such a manually scheduling method cannot adjust the manufacture schedule in time, thereby making product stocks and manufacture costs both increased.

Therefore, how to reply precise exportation time to a client and provide a desirable manufacture schedule is a critical problem to solve.

SUMMARY OF THE INVENTION

A primary objective of the present invention is to provide a method and a system for estimating exportation time, in which upon receiving a client order, a manufacturer can estimate product exportation time for reply to a client by processing and integrating the client order with practical material requirements and stock records.

Another objective of the invention is to provide a method and a system for estimating exportation time, in which a manufacturer is provided with material requirements and stock records, so as to make a corresponding manufacture schedule according to the requirements and records, and to reduce stock products.

In accordance with the foregoing and other objectives, the present invention proposes a method and a system for estimating exportation time. The method for estimating exportation time is used to connect an output/input interface of a manufacturer through a network to a system for estimating exportation time, wherein the system estimates product exportation time for client orders received by the output/input interface of the manufacturer according to practical operating conditions in product manufacture. The method comprises the steps of: (1) determining via the system if the output/input interface of the manufacturer submits a data uploading request, wherein if no uploading request is submitted, step (3) is followed; or else, the system receives manufacture associated data of client order data, material requirement data and stock record data that are uploaded by the manufacturer, and stores the uploaded data in a database of the system, and then step (2) is followed; (2) processing data operation for the manufacture associated data of the client order data, the material requirement data and the stock record data, and storing operation data results of manufacture schedule data, order reply data, abnormal condition data and material insufficiency data in the database; then, the step (1) is followed; (3) determining via the system if the manufacturer submits a data downloading request, wherein if the downloading request is submitted, step (4) is followed; or else, the step (1) is followed; and (4) downloading operation data results from the database corresponding to the submitted request from the manufacturer, and transmitting the downloaded operation data results to the output/input interface of the manufacturer.

The system for estimating exportation time of the invention comprises: a request input module for receiving the data uploading request or the data downloading request from the output/input interface of the manufacturer, and for generating a processing signal corresponding to the data uploading request or the data downloading request; a control module for receiving the processing signal from the request input module, and for outputting a controlling signal according to the received processing signal, wherein the control module includes a storage interface, a schedule interface and a retrieval interface; a first database for storing the manufacture associated data of the client order data, the material requirement data and the stock record data uploaded by the manufacturer; wherein if the control module receives the processing signal from the request input module corresponding to the data uploading request, it generates an uploading controlling signal for prompting the storage interface to store the uploaded manufacture associated data in the first database, and generates an operation controlling signal for prompting the schedule interface to retrieve the uploaded data from the first database for data operation and processing; a second database for storing operation data results of manufacture schedule data, order reply data, abnormal condition data and material insufficiency data produced by the control module; wherein if the control module receives the processing signal from the request input module corresponding to the data downloading request, it generates a downloading controlling signal for prompting the retrieval interface to retrieve the operation data results of the manufacture schedule data, the order reply data, the abnormal condition data and the material insufficiency data from the second database as desirably used as reference for product manufacture; and an output control module for transmitting the retrieved data of the manufacture schedule data, the order reply data, the abnormal condition data and the material insufficiency data to the output/input interface of the manufacturer, so as to allow the manufacturer to be able to control product manufacture for exportation on time and monitor stock quantity in real time.

The system for estimating exportation time of the invention is established in a server, and can also be integrated to be a peripheral device that is connected to a terminal device or a server through a network. Further, the system of the invention can be constructed partly in a computer device, and partly in a server connected to the computer device, depending on practical usage and application.

In the use of the method and system for estimating exportation time of the invention, a first database stores uploaded and manufacture operating data from a manufacturer, so as to prompt the system to perform data operation and processing according to the stored data. Operation data results are stored in a second database, and used as reference to provide manufacture schedule data, order reply data, abnormal condition data and material insufficiency data to be downloaded by the manufacturer, so as to allow the manufacturer to execute product manufacture according to the downloaded data, and immediately realize problems in product manufacture to solve.

BRIEF DESCRIPTION OF THE DRAWINGS

The present invention can be more fully understood by reading the following detailed description of the preferred embodiments, with reference made to the accompanying drawings wherein.

DETAILED DESCRIPTION OF THE PREFERRED EMBODIMENT

Figure 1:
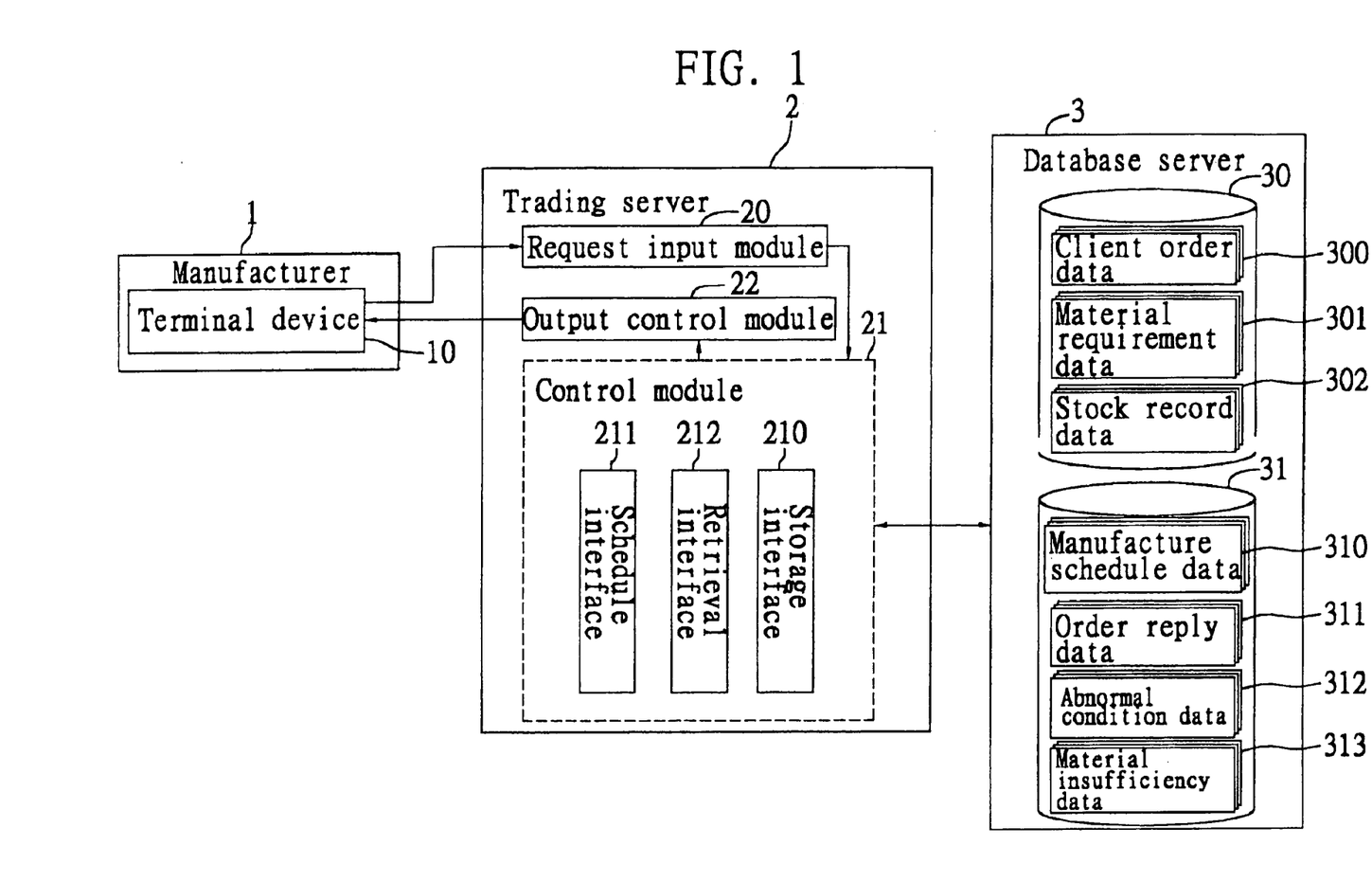
FIG. 1 is a schematic block diagram showing basic architecture of a system for estimating exportation time of the invention.

Referring to FIG. 1, it illustrates basic architecture of a system for estimating exportation time of the invention. As shown in the drawing, the system for estimating exportation time of the invention is established in a trading server 2 and a database server 3, so as to allow a terminal device 10 of a manufacturer 1 to interact with the trading server 2 and the database server 3, after the manufacturer 1 is connected to the trading server 2 and the database server 3 through a network.

The trading server 2 comprises a request input module 20; a control module 21 connected to the request input module 20, and having a storage interface 210, a schedule interface 211 and a retrieval interface 212; and an output control module 22 connected to the control module 21 and the terminal device 10. The database server 3 comprises a first database 30 and a second database 31, and is connected to the control module 21. In the trading server 2, an operation system e.g. a Windows 2000 Server can be employed for the manufacturer 1 to construct a desirable application program, such as the request input module 20 and the output control module 22, so as to allow the trading server 2 to transmit XML (Extensible Markup Language) data with a browser (not shown) of the terminal device 10 or with the database server 3 capable of processing the XML data. Moreover, a network development tool, such as IIS (internet information server) produced by Microsoft, is employed to put data in intranet or internet via HTTP (Hyper Text Transfer Protocol) or FTP (File Transfer Protocol) communication protocol, wherein HTTP allows a browsing web page to be connected to the application program, and FTP allows file transmission, i.e. data uploading or downloading, between the terminal device 10 and the database server 3. Furthermore, for example, ODBC (open database connectivity) software of Microsoft can be employed to construct a desirable application program, such as the control module 21, so as to connect the trading server 2 to the database server 3, for the purpose of database storage and retrieval. In addition, the database server 3 can also utilize the Windows 2000 Server operation system to enhance internal and external data exchange efficiency for the manufacturer 1. SQL Server software can be used for database sharing, so as to allow the manufacturer 1 to immediately realize operating conditions in manufacture. However it should be noted that, the operation system and software installed in the trading server 2 and the database server 3 of the invention are not limited to Microsoft products, but can be other products having the same functions and properties.

The request input module 20 is used to receive a data uploading request or a data downloading request inputted by a user at the terminal device 10 of the manufacturer 1. Upon receiving the data uploading or downloading request, the control module 21 is prompted by the request input module 20 to generate a processing signal corresponding to the received request. Prior to the terminal device 10 submitting a request to the trading server 2, the trading server 2 in advance performs identification and login procedures for the user at the terminal device 10, so as to assure network security; that is, if the user successfully passes the identification procedure for identity recognition, the request is permitted for submission. Since the identification and login procedures are conventional in network operation, they are not further described herein.

First, the user makes use of Excel software of Microsoft Office in the terminal device 10 to in advance edit manufacture associated data files, such as client order data 300 that are to be uploaded, material requirement data 301 or stock record data 302, so as to be subsequently connected to the trading server 2 via a network browser (e.g. Internet Explorer) of the terminal device 10.

If the request input module 20 determines that the user inputs a data uploading request, then uploaded manufacture associated data, such as the client order data 300, the material requirement data 301 or the stock record data 302, are transmitted to the control module 21, so as to prompt the storage interface 210 to store the uploaded manufacture associated data in the first database 30, and to prompt the schedule interface 211 to retrieve the stored data from the first database 30 for data operation and processing. The schedule interface 211 processes data operation for an order date and order items of the client order data 300, a material requirement condition (i.e. a pre-made manufacture schedule) of the material requirement data 301, and a current stock condition of the stock record data 302. Such operation results are used to plan a desirable manufacture schedule, to estimate product exportation time for the client order, and to determine if manufacture properly proceeds and if materials are sufficiently provided. Then, the schedule interface 211 integrates the operation results, and respectively generates manufacture schedule data 310, order reply data 311, abnormal condition data 312 and material insufficiency data 313, which are used as reference for product manufacture and stored in the second database 31.

If the request input module 20 determines that the user inputs a data downloading request, it generates a downloading processing signal to the control module 21, so as to prompt the retrieval interface 212 to retrieve the manufacture schedule data 310, the order reply data 311, the abnormal condition data 312 and the material insufficiency data 313 from the second database 31, which are to be desirably downloaded by the user. When the retrieval 15, interface 212 retrieves the desirable data corresponding to the data downloading request inputted by the user, the control module 21 generates a downloading controlling signal to the output control module 22, so as to transmit the downloaded data from the output control module 22 to the browser of the terminal device 10 in the manufacturer 1, thereby allowing the user at the terminal device 10 to obtain the desirable data for immediately realize current conditions of manufacture scheduling, product exportation and stock.

As described above, the schedule interface 211 retrieves data from the first database 30 for determination of product exportation time and planning of a manufacture schedule, in a manner as to conduct operation for practical operating conditions such as material requirement data 301 and stock record data 302 with currently-received client order data 300. The schedule interface 211 obtains an order date from the client order data 300, and predetermines a number of processing days X, which are referred to interval days between the order date and an exportation date, and can be pre-set as inputted by the user or automatically pre-set by the schedule interface 211. Then, if the schedule interface 211 figures out an exportation date for a client order larger than a sum of an order date and a number of processing days X, currently available resources such as raw materials and stocks of manufactured or semi-manufactured products are obtained from the material requirement data 301 and the stock record data 302, and are set to be in a reserve status, so as to make these available resources used in product manufacture for other client orders with their exportation dates being approached, or to allow an purchasing department to add up new orders for product manufacture, and allow a manufacture schedule to be well adjusted in sufficient time. If the schedule interface 211 figures out an exportation date for a client order smaller than a sum of an order date and a number of processing days X, currently available resources are set to be in a usage status, so as to produce a manufacture schedule for production lines to execute product manufacture; this allows products to be exported on time for the client order, and generates a message of material insufficiency according to a material t a operating condition, so as to prompt the purchasing department to purchase materials for use as necessary.

The system for estimating exportation time of the invention is established in the trading server 2 and the database server 3, but it can also be integrated in a single server, or can be is; integrated to be a peripheral device that is connected to the terminal device 10 or a server through a network. Further, the system of the invention can be constructed partly in a computer device, and partly in a server connected to the computer device, depending on practical usage and application.

In the use of the foregoing system for estimating exportation time of the invention, the manufacturer 1 in advance uploads manufacture associated data of client order data 300, material requirement data 301 and stock record data 302 to the database server 3, and the control module 21 retrieves these uploaded data for data operation and processing. Then, the operation and processed results are stored in the database server 3 and can be downloaded by a user. This therefore allows the manufacturer 1 to realize reason of improper proceeding of product manufacture or delay in product exportation, and to immediately inquire a condition of material insufficiency, and also provides communication and interaction between manufacturers and clients.

Figure 2:
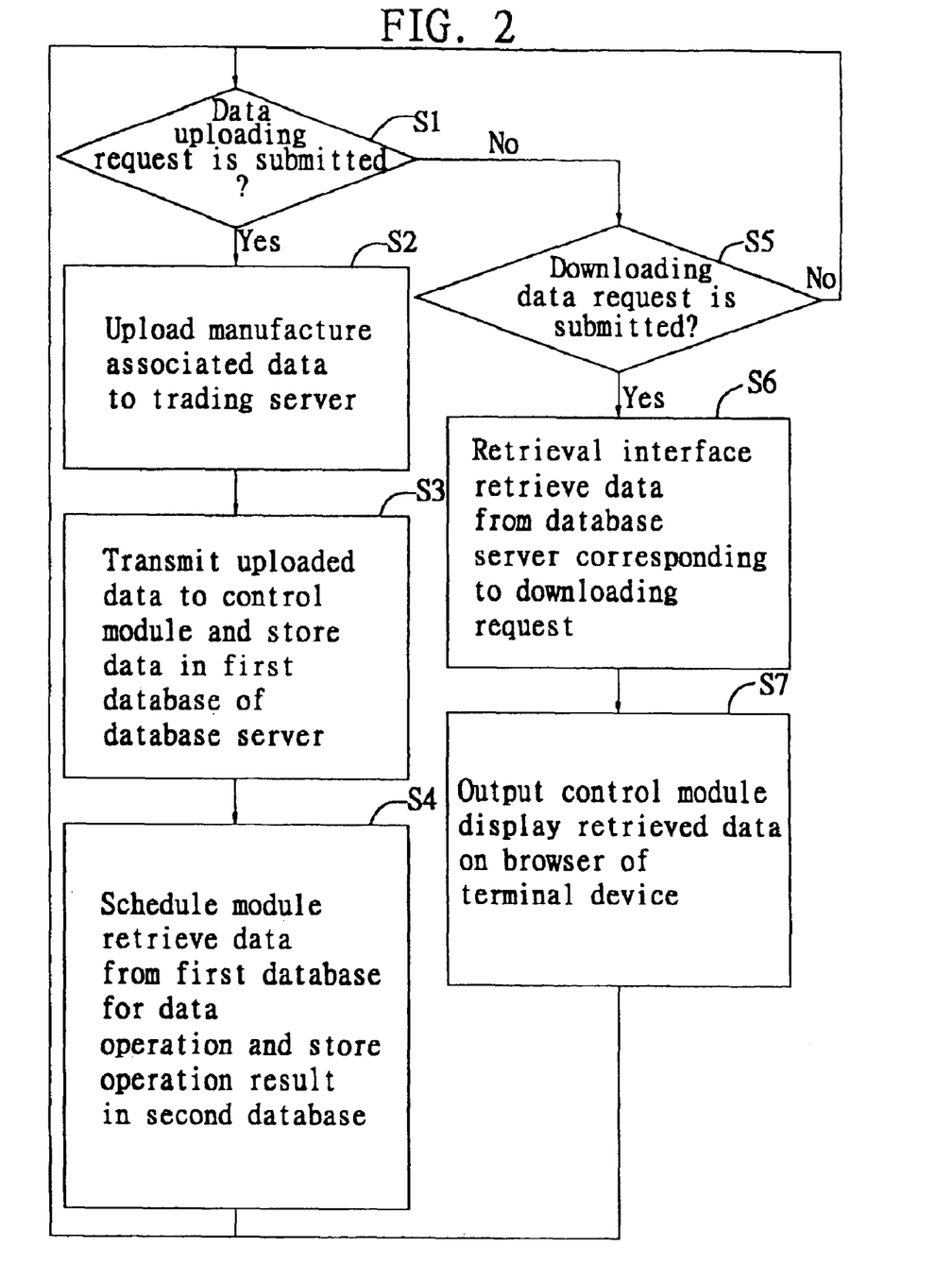
FIG. 2 is a schematic diagram depicting a method for estimating exportation time in the use of a system for estimating exportation time of the invention.

Referring to FIG. 2, it illustrates a method for estimating exportation time in the use of a system for estimating exportation time of the invention. First, a user in advance edits manufacture associated data of client order data 300, material requirement data 301 and stock record data 302, which are to be uploaded. Then, the user is connected through a network browser (e.g. Internet Explorer) of a terminal device 10 to a trading server 2. The following description is made with reference to FIGS. 2 and 3.

First, in step S1, a request input module 20 of the trading server 2 determines if the user submits a data uploading request. If the uploading request is received, then step S2 is followed; or else, step S5 is followed.

In step S2, the user uploads the manufacture associated data of the client order data 300, material requirement data 301 and stock record data 302 to the trading server 2. Thereafter, step S3 is followed.

In step S3, the request input module 20 transmits the uploaded data to a control module 21, so as to prompt a storage interface 210 to transmit the uploaded data to a first database 30 of a database server 3 for storage. Thereafter, step S4 is followed.

In step S4, the storage interface 210 generates a signal of complete data storage to the control module 21, so as to prompt a schedule interface 211 to retrieve desirable data from the first database 30, and process data operation for the retrieved data, wherein operation results are stored in a second database 31 of the database server 3. Thereafter, the step S1 is returned thereto.

In step S5, the request input module 20 determines if the user submits a data downloading request. If the downloading request is received, then step S6 is followed; or else, the step S1 is returned thereto.

In step S6, a retrieval interface 212 is prompted to retrieve operation results from the second database 31 corresponding to the request received by the request input module 20. Thereafter, step S7 is followed.

In step S7, the control module 21 receives the retrieved data from the retrieval interface 212, and prompts an output control module 22 to display the retrieved data on a browser (not shown) of the terminal device 10, so as to allow a manufacturer to obtain manufacture operating data of manufacture schedule data 310, order reply data 311, abnormal condition data 312 and material insufficiency data 313, and to be able to analyze reason of delay in product exportation and inquire a condition of material insufficiency. Thereafter, the step S1 is returned thereto.

Figure 3:
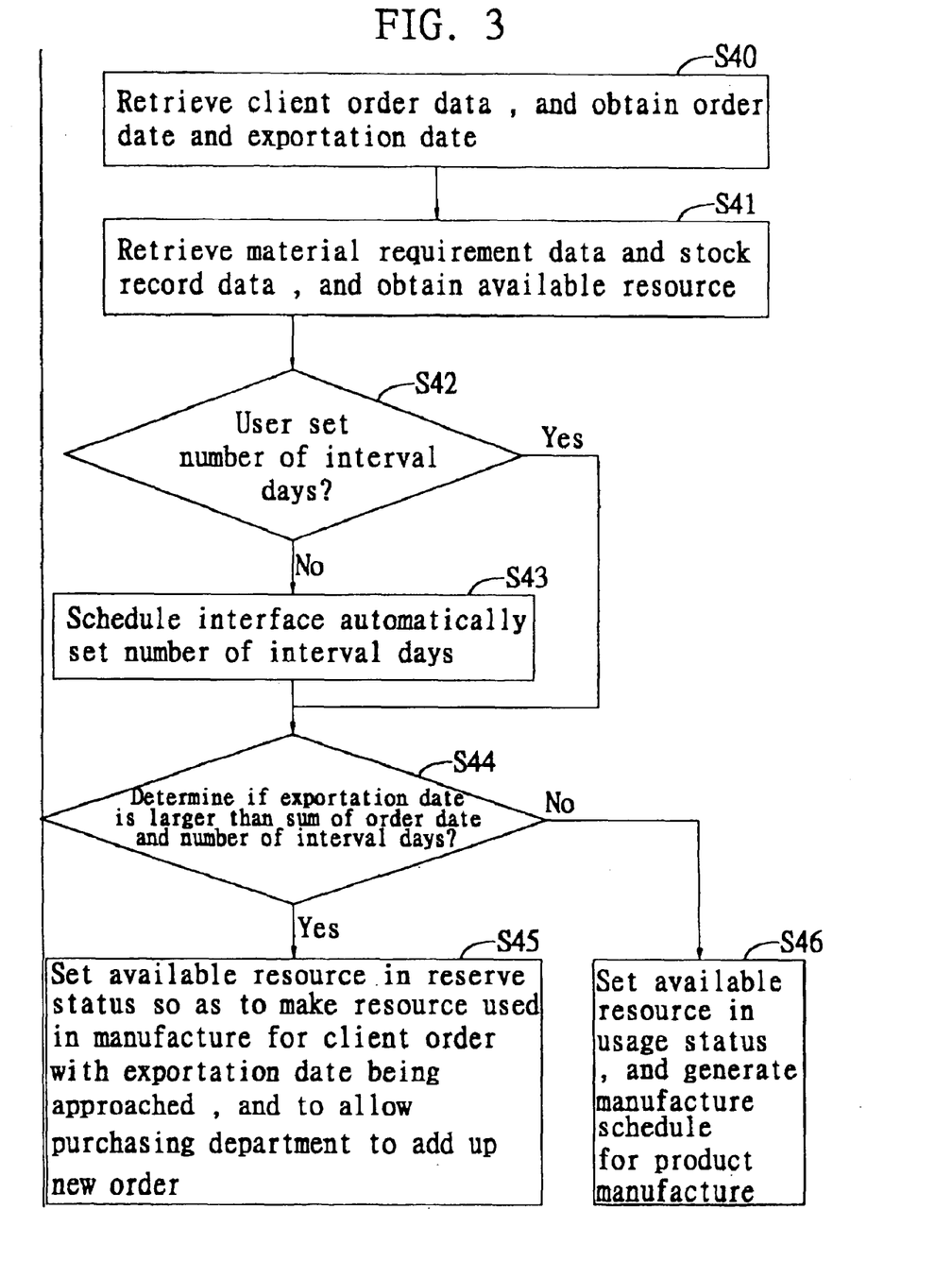
FIG. 3 is a schematic diagram depicting step S4 of FIG. 2 in detail.

Referring to FIG. 3, it illustrates step S4 of FIG. 2 in detail. As shown in the drawing, in step 40, the schedule interface 211 retrieves the client order data 300 from the first database 30, so as to obtain an order date and an exportation date in the client order data 300. Thereafter, step S41 is followed.

In step S41, the schedule interface 211 retrieves the material requirement data 301 and stock record data 302 from the first database 30, so as to obtain currently available manufacture resources. Thereafter, step S42 is followed.

In step S42, according to the client order data 300, the schedule interface 211 determines if a number of processing days X is predetermined by the user. If the user does not set the X value, then step S43 is followed; or else, step S44 is followed.

In step S43, the schedule interface 211 automatically sets the X value to be 2 normally. Thereafter, step S44 is followed.

In step S44, the schedule interface 211 determines if the exportation date is larger than a sum of the order date and the number of processing days X. If the exportation date is larger, then step S45 is followed; or else, step S46 is followed.

In step S45, the obtained available manufacture resources from the material requirement data 301 and stock record data 302 are set to be in a reserve status, so as to make these available resources used in product manufacture for other client orders with their exportation dates being approached, or to allow an purchasing department to add up new orders for product manufacture. This further allows the schedule interface 211 to establish manufacture schedule data 310 for production lines to execute product manufacture according to those foregoing other client orders, added new orders and the client order with the exportation date determined to be larger than the sum of the order date and the X value. Simultaneously, the schedule interface 211 generates order reply data 311 for replying the client with precise product exportation time, whereas the manufacture schedule data 310 and order reply data 311 are stored in the second database 31.

In step S46, the obtained available manufacture resources from the material requirement data 301 and stock record data 302 are set to be in a usage status, so as to make these g M available resources used in product manufacture for the client order with the exportation date determined to be smaller than the sum of the order date and the X value. Further, the schedule interface 211 constructs manufacture schedule data 310 for production lines to execute product manufacture and allows products to be exported on time for the client order. Simultaneously, the schedule interface 211 generates order reply data 311 for replying the client with precise product exportation time, whereas the manufacture schedule data 310 and order reply data 311 are stored in the second database 31.

Moreover, in the step S46, during planning the manufacture schedule data 310 according to the material requirement data 301, stock record data 302 and client order data 300, if the schedule interface 211 determines that the available resources are not sufficient for product manufacture according to the client order data 300, it generates material insufficiency data 313 to be used as reference for purchasing materials by the purchasing department.

In addition, if the user desires to delete a record of client order data 300 stored in the first database 30 in a condition of an order cancelled by a client, the schedule interface 211 is prompted to generates a record of abnormal condition data 312 according to the deleted client order data 300, so as to allow the production lines to retrieve the abnormal condition data 312 and stop product manufacture. If products for the deleted client order data 300 are manufactured or semi-manufactured, the schedule interface 211 generates a record of stock record data 302 for the manufactured or semi-manufactured products, which are to be used as available resources for subsequent orders.

Figure 4:
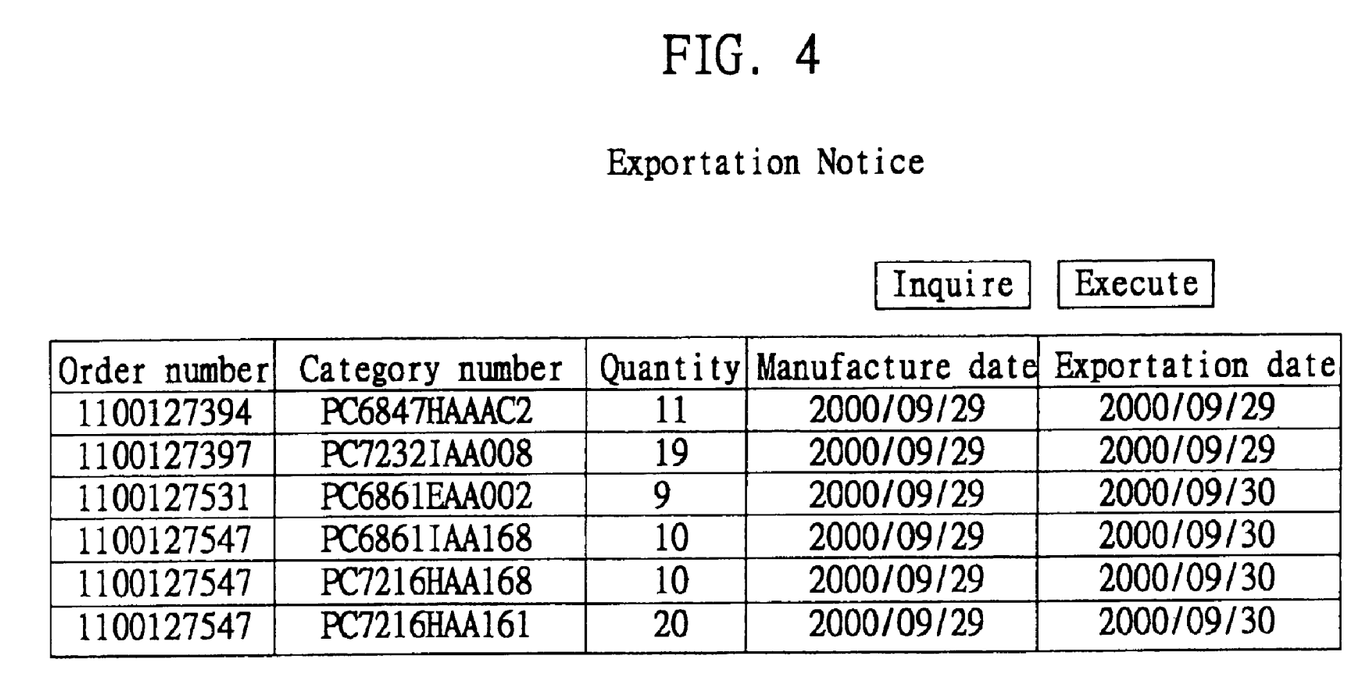
FIG. 4 is a schematic diagram showing a picture for replying a client order in the practical use of a method and a system for estimating exportation time of the invention.

Referring to FIG. 4, it illustrates a picture 4 for replying a client order in the practical use of a method and a system for estimating exportation time of the invention. After a terminal device 10 in advance is connected to a trading server 2 through a network, a user at the terminal device 10 inputs a request for downloading order reply via a network browser (not shown), so as to prompt the trading server 2 to retrieve order reply data 311 from a database server 3, and transmit the retrieved order reply data 311 to the terminal device 10 for display. This therefore allows precise product exportation time to be informed between a manufacturer 1 and a client.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for estimating exportation time, for connecting an output/input interface of a manufacturer through a network to a system for estimating exportation time, wherein the system estimates product exportation time for client orders received by the output/input interface of the manufacturer according to practical operating conditions in product manufacture, the method comprising the steps of:

(1) determining via the system if the output/input interface of the manufacturer submits a data uploading request, wherein if no uploading request is submitted, step (3) is followed; or else, the system receives manufacture associated date of client order data, material requirement data and stock record data that are uploaded by the manufacturer, and stores the uploaded data in a database of the system, and then step (2) is followed;

(2) processing data operation for the manufacture associated data of the client order data, the material requirement data and the stock record data, and storing operation data results of manufacture schedule data, order reply data, abnormal condition data and material insufficiency data in the database; then, the step (1) is followed;

(3) determining via the system if the manufacturer submits a data downloading request, wherein if the downloading request is submitted, step (4) is followed: or else, the step (1) is followed; and (4) downloading operation data results from the database corresponding to the submitted request from the manufacturer, and transmitting the downloaded operation data results to the output/input interface of the manufacturer;

wherein the system comprises:

a request input module for receiving the data uploading request or the data downloading request from the output/input interface of the manufacturer, and for generating a processing signal corresponding to the data uploading request or the data downloading request;

a control module for receiving the processing signal from the request input module, and for outputting a controlling signal according to the received processing signal, wherein the control module includes a storage interface, a schedule interface and a retrieval interface;

a first database for storing the manufacture associated data of the client order data, the material requirement data and the stock record data uploaded by the manufacturer; wherein if the control module receives the processing signal from the request input module corresponding to the data uploading request, it generates an uploading controlling signal for prompting the storage interface to store the uploaded manufacture associated data in the first database, and generates an operation controlling signal for prompting the schedule interface to retrieve the uploaded data from the first database for data operation and processing;

a second database for storing operation data results of manufacture schedule data, order reply data, abnormal condition data and material insufficiency data produced by the control module; wherein if the control module receives the processing signal from the request input module corresponding to the data downloading request, it generating a downloading controlling signal for prompting the retrieval interface to retrieve the operation data results of the manufacture schedule data, the order reply data, the abnormal condition data and the material insufficiency data from the second database as desirably used as reference for product manufacture; and an output control module for transmitting the retrieved data of the manufacture schedule data, the order reply data, the abnormal condition data and the material insufficiency data to the output/input interface of the manufacturer, so as to allow the manufacturer to be able to control product manufacture for exportation on time and monitor stock quantity in real time.

2. The method of claim 1, wherein the step (2) further comprises the steps of:

(2-1) retrieving the client order data from the database of the system for obtaining an order date and an exportation date from the client order data, and retrieving the material requirement data and the stock record data for obtaining currently available resources;

(2-2) determining via the system, if a user sets a number of interval days between the order date and the exportation date according to the client order data, wherein if the number of interval days is not set by the user, then it is automatically set by the system;

(2-3) determining via the system according to the client order data if the exportation date is larger than a sum of the order data and the number of interval days, wherein if the exportation date is larger, step (2-4) is followed; or else, step (2-5) is followed;

(2-4) setting the obtained available resources from the material requirement data and the stock record data via the system to be in a reserve status, so as to make the available resources used in product manufacture for other client orders with their exportation dates being approached, or to allow an purchasing department to add up new orders for product manufacture; and establishing manufacture schedule data via the system for production lines to execute product manufacture according to order requirements, and generating order reply data so as to estimate precise product exportation time, wherein the manufacture schedule data and the order reply data are stored in the database; and (2-5) setting the obtained available resources from the material requirement data and the stock record data via the system to be in a usage status, so as to make the available resources used in product manufacture for the client order data with the exportation date determined to be smaller than the sum of the order date and the number of interval days; and constructing manufacture schedule data via the system for production lines to execute product manufacture so as to allow products to be exported on time according to the client order data, and generating order reply data so as to estimate precise product exportation time, whereas the manufacture schedule data and the order reply data are stored in the database.

3. The method of claim 2, wherein the step (2-5) further comprises a step of: generating material insufficiency data via the system if the available resources are determined to be insufficient for product manufacture according to the client order data, and storing the material insufficiency data in the database, in the construction of the manufacture schedule data.

4. The method of claim 2, wherein die step (2-5) further comprises a step of: generating a record of abnormal condition data via the system corresponding to a request for deleting a record of client order data from the manufacturer received by the system, so as to allow the production lines to stop product manufacture according to the abnormal condition data.

5. The method of claim 1, wherein the output/input interface is a terminal device.

6. The method of claim 1, wherein the system is established in a server.

7. A method for estimating exportation time, for connecting an output/input interface of a manufacturer through a network to a system for estimating exportation time, wherein the system estimates product exportation time for client orders received by the output/input interface of the manufacturer according to practical operating conditions in product manufacture, the method comprising the steps of:

(1) determining via the system if the output/input interface of the manufacturer submits a data uploading request, wherein if no uploading request is submitted, step (7) is followed; or else, the system receives manufacture associated data of client order data, material requirement data and stock record data that are uploaded by the manufacturer, and stores the uploaded data in a database of the system, and then step (2) is followed;

(2) retrieving the client order data via the system from the database for obtaining an order date and an exportation date, and retrieving the material requirement data and the stock record data for obtaining currently available resources;

(3) determining via the system if a user sets a number of interval days between the order date and the exportation date according to the client order data, wherein if the number of interval days is not set by the user, then it is automatically set by the system;

(4) determining via the system according to the client order data if the exportation date is larger than a sum of the order data and the number of interval days, wherein if the exportation date is larger, step (5) is followed; or else, step (6) is followed;

(5) setting the obtained available resources from the material requirement data and the stock record data via the system to be in a reserve status, so as to make the available resources used in product manufacture for other client order with their exportation dates being approached, or to allow an purchasing department to add up new orders for product manufacture; and establishing manufacture schedule data via the system for production lines to execute product manufacture according to order requirements, and generating order reply data so as to estimate precise product exportation time, wherein the manufacture schedule data and the order reply data are stored in the database; thereafter, the step (1) is followed;

(6) setting the obtained available resources from the material requirement data and the stock record data via the system to be in a usage status, so as to make the available resources used in product manufacture for the client order data with the exportation date determined to be smaller than the sum of the order date and the number of interval days; and constructing manufacture schedule data via the system for production lines to execute product manufacture so as to allow products to be exported on time according to the client order data, and generating order reply data so as to estimate precise product exportation time, whereas the manufacture schedule data and the order reply data are stored in the database; thereafter, the step (1) is followed;

(7) determining via the system if the manufacturer submits a data downloading request, wherein if the downloading request is submitted, step (8) is followed; or else, the step (1) is followed; and (8) downloading operation data results from the database corresponding to the submitted request from the manufacturer, and transmitting the downloaded operation data results to the output/input interface of the manufacturer.

8. The method of claim 7, wherein the step (6) further comprises a step of: generating material insufficiency data via the system if the available resources are determined to be insufficient for product manufacture according to the client order data, and storing the material insufficiency data in the database, in the construction of the manufacture schedule data.

9. The method of claim 7, wherein the step (6) further comprises a step of: generating a record of abnormal condition data via the system corresponding to a request for deleting a record of client order data from the manufacturer received by the system, so as to allow the production lines to stop product manufacture according to the abnormal condition data.

10. The method of claim 7, wherein the output/input interface is a terminal device.

11. The method of claim 7, wherein the system is established in a server.

12. A system for estimating exportation time comprising:

a request input module for receiving the data uploading request or the data downloading request from the output/input interface or the manufacturer, and for generating a processing signal corresponding to the data uploading request or the data downloading request;

a control module for receiving the processing signal from the request input module, and for outputting a controlling signal according to the received processing signal, wherein the control module includes a storage interface, a schedule interface and a retrieval interface;

a first database for storing the manufacture associated data of the client order data, the material requirement data and the stock record data uploaded by the manufacturer; wherein if the control module receives the processing signal from the request input module corresponding to the data uploading request, it generates an uploading controlling signal for prompting the storage interface so store the uploaded manufacture associated data in the first database, and generates an operation controlling signal for prompting the schedule interface to retrieve the uploaded data from the first database for data operation and processing;

a second database for storing operation data results of manufacture schedule data, order reply data, abnormal condition data and material insufficiency data produced by the control module; wherein if the control module receives the processing signal from the request input module corresponding to the data downloading request, it generates a downloading controlling signal for prompting the retrieval interface to retrieve the operation data results of the manufacture schedule data, the order reply data, the abnormal condition data and the material insufficiency data from the second database as desirably used as reference for product manufacture; and an output control module for transmitting the retrieved data of the manufacture schedule data, the order reply data, the abnormal condition data and the material insufficiency data to the output/input interface of the manufacturer, so as to allow the manufacturer to be able to control product manufacture for exportation on time and monitor stock quantity in real time;

wherein if the schedule interface obtains an order date and a number of interval days according to the client order data, and determines that an exportation date is larger than a sum of the order date and the number of interval days, currently available resources of stocks of manufactured or semi-manufactured products are obtained according to the material requirement data and the stock record data, and set to be in a reserve status, so as to make the available resources used in product manufacture for other client orders with their exportation dates being approached, or to allow a purchasing department to add up new orders for product manufacture and well adjust a manufacture schedule in sufficient time; and if the schedule interface determines that the exportation date is smaller than the sum of the order date and the number of interval days, the currently available resources are set to be in a usage status, so as to construct manufacture schedule data for production lines to execute product manufacture for allowing products to be exported on time according to the client order data, and to generate material insufficiency data for material purchasing.

13. The system of claim 12, wherein the output/input interface is a terminal device.

14. The system of claim 12, wherein the system is established in a server.

15. The system of claim 12, wherein if the control module generates an operation controlling signal for prompting the schedule interface to retrieve the uploaded data from the first database for data operation and processing, the data operation is performed by processing the material requirement data and the stock record data with currently-received client order data.

16. The system of claim 15, wherein if the schedule interface receives a request for deleting a record of client order data from the manufacturer, it generates a record of abnormal condition data corresponding to the deleted client order data, so as to allow the production lines to stop product manufacture according to the abnormal condition data.

17. The system of claim 15, wherein the number of interval days is referred to a number of days between the order date and the exportation date, and is set as inputted by the manufacturer or automatically set by the schedule interface.

* * * * *

UNITED STATES PATENT AND TRADEMARK OFFICE
CERTIFICATE OF CORRECTION

PATENT NO. : 6,901,416 B2
DATED : May 31, 2005
INVENTOR(S) : Tsai et al.

It is certified that error appears in the above-identified patent and that said Letters Patent is hereby corrected as shown below:

Column 4,
Line 61, delete "retrieval 15," and insert therefore -- retrieval --

Column 5,
Line 34, delete "material t a" and insert therefor -- material --
Line 40, delete "be is;" and insert therfor -- be --

Column 7,
Line 17, delete "g M available" and insert therefor -- available --

Column 8,
Line 13, delete "date" and insert therefor -- data --
Line 27, delete "followed:" and insert therefor -- followed; --
Line 64, delete "generating" and insert therefor -- generates --

Column 9,
Line 19, delete "system," and insert therefor -- system --
Line 26, delete "data" and insert therefor -- date --
Line 63, delete "die" and insert therefor -- the --

Column 10,
Line 36, delete "data" and insert therefor -- date --
Line 43, delete "order" and insert therefor -- orders --

UNITED STATES PATENT AND TRADEMARK OFFICE
CERTIFICATE OF CORRECTION

PATENT NO. : 6,901,416 B2
DATED : May 31, 2005
INVENTOR(S) : Tsai et al.

It is certified that error appears in the above-identified patent and that said Letters Patent is hereby corrected as shown below:

Column 11,
Line 31, delete "or" and insert therefor -- of --
Line 47, delete "so" and insert therefor -- to --

Signed and Sealed this

Ninth Day of August, 2005

JON W. DUDAS
*Director of the United States Patent and Trademark Office*